United States Patent
MacDonald (10) Patent No.: US 9,218,205 B2
(45) Date of Patent: Dec. 22, 2015

(54) RESOURCE MANAGEMENT IN EPHEMERAL ENVIRONMENTS

(75) Inventor: Wilson T. MacDonald, Holliston, MA (US)

(73) Assignee: CA, Inc., New York, NY (US)

( * ) Notice: Subject to any disclaimer, the term of this patent is extended or adjusted under 35 U.S.C. 154(b) by 318 days.

(21) Appl. No.: 13/546,653

(22) Filed: Jul. 11, 2012

(65) Prior Publication Data

US 2014/0019797 A1 Jan. 16, 2014

(51) Int. Cl.
| | |
|---|---|
| G06F 11/00 | (2006.01) |
| G06F 9/50 | (2006.01) |
| G06F 11/30 | (2006.01) |
| G06F 11/34 | (2006.01) |

(52) U.S. Cl.
CPC .......... G06F 9/5011 (2013.01); G06F 11/3006 (2013.01); G06F 11/3051 (2013.01); G06F 11/3409 (2013.01)

(58) Field of Classification Search
CPC .................................................. G06F 11/2028
See application file for complete search history.

(56) References Cited

U.S. PATENT DOCUMENTS

| | | | |
|---|---|---|---|
| 6,278,694 B1 | 8/2001 | Wolf et al. | |
| 6,802,062 B1 | 10/2004 | Oyamada et al. | |
| 6,813,634 B1 * | 11/2004 | Ahmed | 709/224 |
| 6,961,941 B1 | 11/2005 | Nelson et al. | |
| 7,246,159 B2 * | 7/2007 | Aggarwal et al. | 709/220 |
| 7,698,545 B1 | 4/2010 | Campbell et al. | |
| 7,979,857 B2 | 7/2011 | Esfahany et al. | |
| 7,979,863 B2 | 7/2011 | Esfahany et al. | |
| 7,991,956 B2 | 8/2011 | Illikkal et al. | |
| 2004/0165535 A1 * | 8/2004 | Rajsic | 370/242 |
| 2006/0136913 A1 | 6/2006 | Sameske | |
| 2006/0271939 A1 * | 11/2006 | Joris et al. | 719/313 |
| 2007/0127388 A1 * | 6/2007 | Mack-Crane | 370/252 |
| 2009/0199177 A1 | 8/2009 | Edwards et al. | |
| 2010/0161805 A1 | 6/2010 | Yoshizawa et al. | |
| 2010/0162259 A1 | 6/2010 | Koh et al. | |
| 2010/0275241 A1 | 10/2010 | Srinivasan | |
| 2011/0103227 A1 * | 5/2011 | Meier et al. | 370/235 |
| 2013/0205101 A1 * | 8/2013 | Kenyon et al. | 711/154 |

* cited by examiner

*Primary Examiner* — Amine Riad
(74) *Attorney, Agent, or Firm* — Gilliam IP PLLC (57) ABSTRACT

A system executes a method that includes monitoring the systems that provide the provisioning of computing infrastructure resources to provide services for services executing on the resources, to monitor provisioning changes on the infrastructure resources. It further uses the information gathered by the monitoring of the provisioning resource(s) to provide a tag, which denotes the current assignment of each resource with a service name and an instance of the service associated with the resource identifier and a time stamp, and storing this a relational database, as a part of the record of the state, or performance data for that resource during that time interval.

20 Claims, 5 Drawing Sheets

| Timestamp | elementId | Name | Var1 | Var2 | Service | Instance |
|---|---|---|---|---|---|---|
| T2 | 1000001 | system1Disk1 | 1500 | .02 | | |
| T2 | 1000002 | system2Disk1 | 1500 | .02 | | |
| T2 | 1000003 | system3Disk1 | 1500 | .02 | | |

| Timestamp | elementId | Name | Var1 | Var2 | Service | Instance |
|---|---|---|---|---|---|---|
| T1 | 1000001 | system1Disk1 | 1500 | .15 | tmSvr | 001 |
| T1 | 1000002 | system2Disk1 | 1500 | .15 | tmSvr | 002 |
| T1 | 1000003 | system3Disk1 | 1500 | .02 | | |

RESOURCE MANAGEMENT IN EPHEMERAL ENVIRONMENTS

BACKGROUND

In many ways the field of information technology (IT) infrastructure management is mature. Many systems provide the ability to perform fault and performance management for the devices and interconnections, which make up the infrastructure that supports the applications that IT provides. More recently with the adoption of CMDB technology, complex infrastructures can be mapped as services. Measurements of the quality of the service delivery can also be monitored. Traffic flows can be monitored at the packet level, or exposed in the aggregate.

As the computing environment evolves with technologies such as virtualization, and the ability to provision machine images at will, a new style of computing has evolved. This new style exploits the elasticity of these infrastructures, along with orchestration to create wildly scalable applications that "pay as they go," only provisioning the capacity needed at any point in time.

This style of computing, and indeed virtualization itself poses challenges to traditional IT management systems, which were designed at a time where infrastructures were fairly static, and large changes were adopted as part of planned migrations.

The state of the art in determining the infrastructure involved in providing services is that, potential hardware resources are discovered and polled. The information collected identifies what infrastructure resources were active and at what time. The information is be used to piece together the picture of how the infrastructure was behaving at any point in time. This conventional process requires intimate knowledge of the operations of the infrastructure, as well as some amount of hand-assembly to put the picture together.

BRIEF SUMMARY

A system executes a method that includes monitoring provisioning changes on infrastructure resources that have been provisioned to provide services, tagging performance data for resources which are currently involved in the delivery of a service with a service name and an instance of the service associated with the resource identifier and a time stamp, and storing the tagged data in a relational database.

The method may be incorporated in computer programming stored on a computer readable medium, such as a storage device.

In a further embodiment, a system includes a monitoring mechanism is coupled to poll infrastructure resources that have been provisioned to provide services, to discover information about the resource that has been provisioned and generate a tag of a state of each infrastructure resource that has been provisioned, identifying a service and instance of the service provisioned to the resource. A report engine that uses the tags to create a time series view of the services performed by each resource.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

A set of resources in an ephemeral computing environment form one or more virtual machines that may be used for performing functions for a set of products or services. In various embodiments, a tagging scheme is used to tag infrastructure data at collection time. Using those tags at query time, a coherent view of the resources involved in providing a service over time is provided. This may be referred to as a time series view. In one example, a shift from a primary to a backup virtual server is an event "in the kitchen," but should be transparent to users. With this capability, an analyst has the ability to see how the service infrastructure components were behaving over time regardless of whether they were on the primary or backup hardware. Likewise, multiple instances can appear and disappear, and could be represented in tables and charts as they do so. Aggregates can be done of total disk usage users, queries, and other similar views of the data can be created.

Hardware or partitions that are used to perform one service in one poll, and a different service in subsequent polls can be properly apportioned over time, without the current problem that once you assign a set of resources to a service, all the samples for that resource are assigned to that service, regardless of whether the service was being delivered by that component at a given point in time.

The services may be broken down into a set of sub-services. Data regarding a service and the component providing the service is tagged as it is polled and inserted into the database. These tags contain information facilitating tracking the assignment of infrastructure resources to service delivery dynamically.

In one example, a set of services is performed for a set of products that utilize an application life cycle management framework. The framework utilizes many dedicated virtual machine partitions, with a discrete operating environment, and services such as IO/Memory/Disk. At any given time, either the primary or the secondary would be active, for one or more of a pair of servers.

Figure 1:
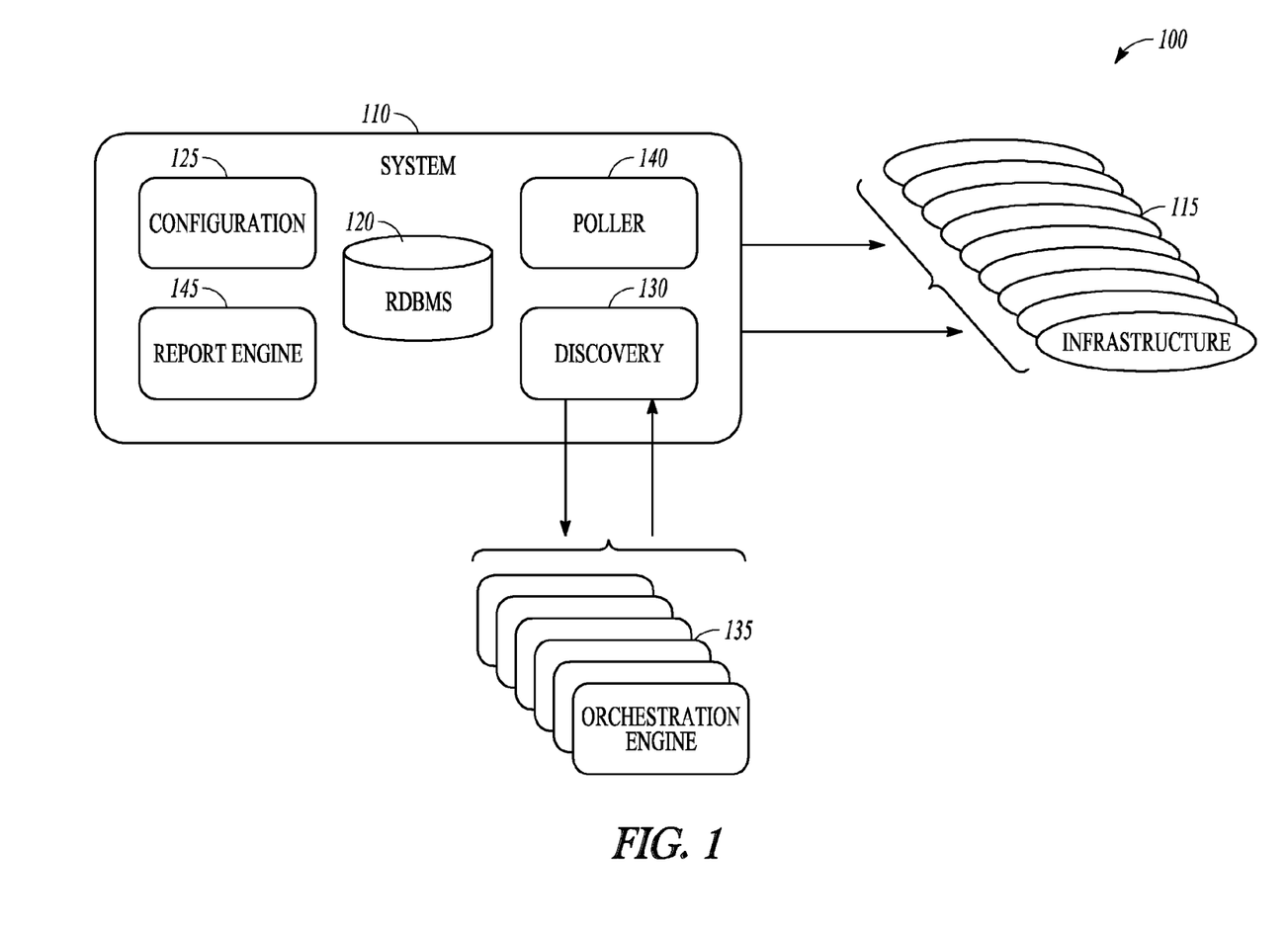
FIG. 1 is a block diagram of a provisioning system according to an example embodiment.

FIG. 1 is a block diagram of an example system infrastructure 100 that provisions and manages resources for various applications. Infrastructure 100 includes a system 110 that provisions infrastructure resources 115 with applications. In various embodiments, system 100 includes a relational database management system 120 that tracks resources that are provisioned to execute applications. A configuration manager 125 is used to deploy resources from infrastructure 115, including selection of bare metal and programming with support software such as operating systems and applications. The infrastructure resources are found and classified utilizing a discovery engine represented at 130 and 135, and information representing the resources, referred to as a configuration, is stored in database 120 in static form until updated. A polling engine 140 uses information stored in the configuration, along with other references such as device models, and SNMP mappings to poll data from the infrastructure 115 at specified intervals, such as every five minutes, or other selected time interval.

The resulting data is stored in the database 120 as a time series for use by other components of the system, such as a report engine 145. In the database 120, each data sample may be mapped to a stack ID, which persists for the life of the data. Elsewhere in the system, this ID may be mapped in various ways, through parenting and grouping and other means to provide aggregations. As the data series have a single ID, these mappings may not account for the ephemeral nature of some of the developments occurring in cloud computing.

In one embodiment, elastic compute infrastructures 115 are controlled in various manners utilizing some sort of orchestration 135. At any point in time, the current state of the infrastructure that is being provisioned is known to these engines. Interfaces are provided at 135 to periodically extract that information. Using the extracted information, the system can create a dynamic map of what infrastructure is performing what role for each managed service. The infrastructure may be granularized to a desired resource element level, such as memory, disk, core, interface, etc. This information can be updated through mechanisms such as periodic querying, or through the use of messages, such as SNMP traps to notify the system when the state changes. Using this dynamic mapping of infrastructure to service/role, the system 110 tags each sample from each monitored element as the data is stored. Queries can then be performed by the reporting and other analysis engines 145, which now are able to represent the service as it performs and evolves over time.

A method of doing this mapping would be to add to the information in the database 120. Generally these data samples are stored in a row in the database, with the various data from the instrumentation, along with some amount of metadata to aid in queries. In one embodiment, a row may be extended, such as in the metadata area, to include fields to store resource element assignment data. The storage can be done "at poll time", or later in a batch job, or by other means.

Figure 2:
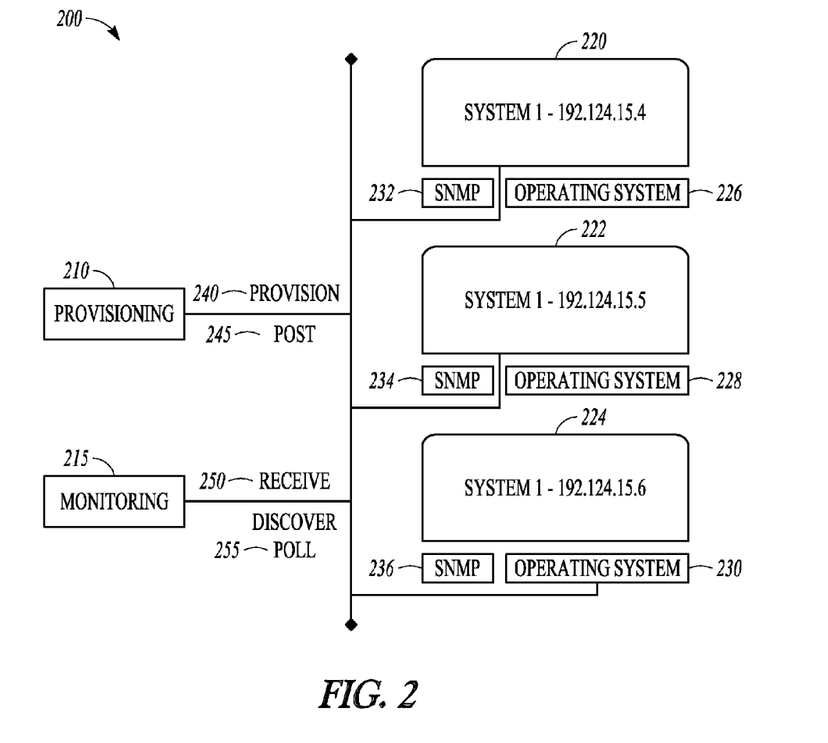
FIG. 2 is block flow diagram illustrating a method of provisioning and monitoring infrastructure resources according to an example embodiment.

FIG. 2 is a block diagram of a process 200 of provisioning infrastructure according to an example embodiment. A provisioning mechanism 210 and monitoring mechanism 215 interact with bare metal resources 220, 222, and 224. Each bare metal resource has a different IP type address in one embodiment. The provisioning mechanism 210 installs an operating system 226, 228, and 230 on the respective resources 220, 222, and 224, as well as an SNMP agent 232, 234, and 236. As indicated in this simple example, at 240, the provisioning mechanism triggers the installation of the operating systems and the SNMP agent. It then notifies the monitoring mechanism 215 of the provisioning via a post 245.

The monitoring mechanism 215 receives the post that identifies the three resource addresses and installed software at 250. The monitoring mechanism 215 then performs a discover operation at 255 by polling the resources to discover resource elements, such as disks, cores, memory, etc. While three machines are illustrated, in some embodiments, 150 or more machines may be provisioned and monitored. In one embodiment, the polling obtains information about resource utilization as well, such as the number or percentage of available terabytes of storage being used.

Figure 3:
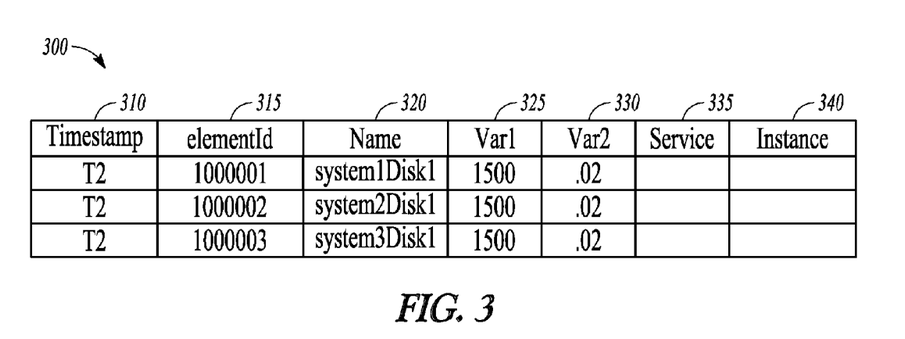
FIG. 3 is a block diagram of a tagged data structure representative of provisioned resources according to an example embodiment.

FIG. 3 is a block diagram of a data structure 300 that is created to store information about the resources that have been provisioned. This data structure contains three rows, corresponding to three different systems that have been provisioned, each having one system disk. While three rows are shown, one for each resource that is provisioned, many elements of each resource may have similar rows that have a time stamp 310, element ID 315, name 320, variable 1 325, variable 2 330, service 335, and instance 340. The timestamp 310 may include a date and time that is synchronized with the system 100. Element ID 315 may be the SSID, IP address, or any other desired identifier sufficient to distinguish between resources in the system. Var 1 and Var 2 in the rows shown refer to the size of the disk and percent utilization. Other variables may be used for other resources, such as speed of a core and percent utilization of the core.

The last two columns, service 335 and instance 340 comprise a tag, correlating the resource element to a service and an instance of the service. In one embodiment, the service may be an application, such as a Team Server application by CA Inc. Many different applications may be provisioned on a single server, and across several servers if needed to handle demand for the service, making for a dynamic system that can grow and shrink as needed while maintaining a desired quality of service. Many other rows may be used to indicate various portions of systems, also referred to as resources that provide the services. Since the tags are inserted into the database each time resources are reconfigured or reprovisioned, the tags contain information facilitating tracking the assignment of infrastructure resources to service delivery dynamically.

Figure 4:
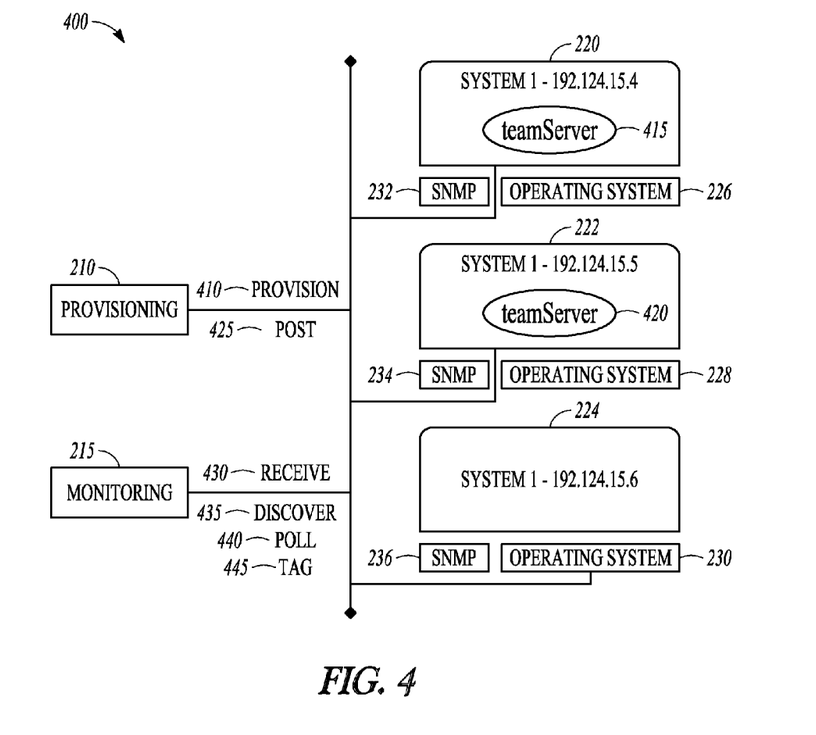
FIG. 4 is block flow diagram illustrating a method of provisioning and monitoring infrastructure resources with services according to an example embodiment.

FIG. 4 is a block flow diagram representing a method 400 of provisioning an application. At 410, an application, TeamServer, is provisioned to system 220 and 222 at 415 and 420 respectively. The information corresponding to the provisioning is posted at 425 and received by the monitoring mechanism 215 at 430. Discovery is performed at 435 via polling 440. At 445, the information collected via the polling 440 is tagged and added to the database as illustrated at data structure 500 in FIG. 5. Data structure 500 now includes the service—TeamServer, abbreviated tmSvr in the first two rows corresponding to system 1 and system 2, with each instance 340 indicted respectively as 01 and 02.

Figure 6:
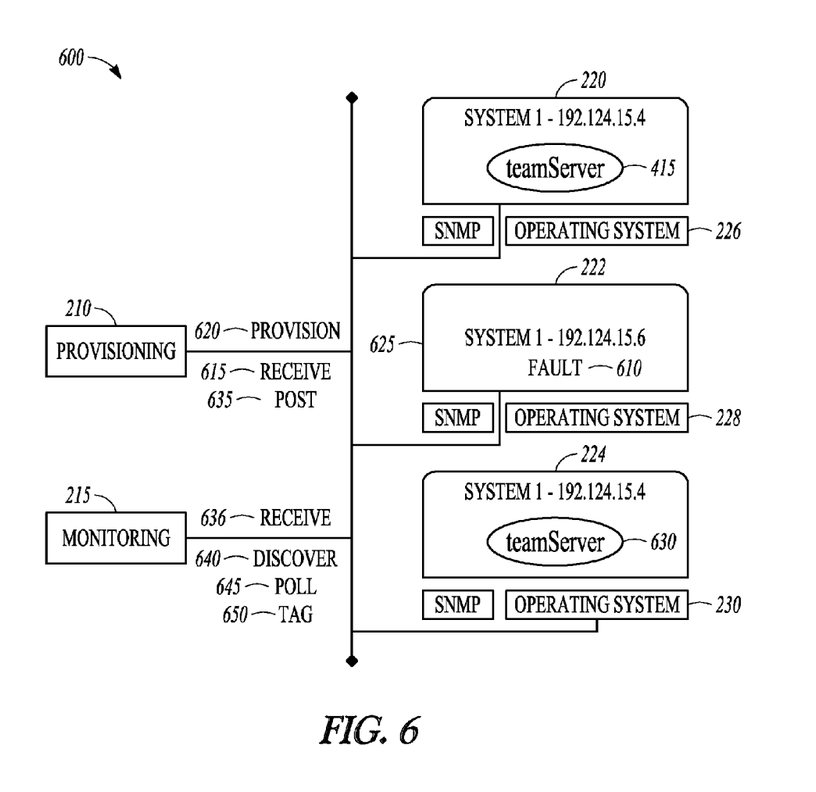
FIG. 6 is block flow diagram illustrating a method of monitoring infrastructure resources for faults and reprovisioning services according to an example embodiment.

FIG. 6 is a block flow diagram illustrating detection of a fault and reprovisioning of an application at 600. The monitoring mechanism 215 detects a fault 610 on system 222 and receives information identifying the fault at 615. The fault can be due to any failure of a resource utilized to execute the application 415 such that the application is no longer able to provide service. In response to the receipt of the fault, the provisioning system 210 may remove the application as indicated at provision action 620 and brackets 625. In some embodiments, if system 222 is incapacitated, the provisioning system 210 may simply modify the data structure to indicate that system 222 no longer is provisioned with the application. System 224 is then provisioned with the application as indicated at 630.

The provisioning of the application at 630 is then indicated by a post 635 which is received 636 at monitoring mechanism 215, followed by discovery 640. Discover action 640 includes polling 645, and tagging 650 with information indicating the provisioning of the application on server 224. The monitoring mechanism 215 then posts that information at 655, resulting in modification of the data structure as indicated at 700 in FIG. 7, where the application is now indicated as having a second instance on server 224 at 710.

Figure 5:
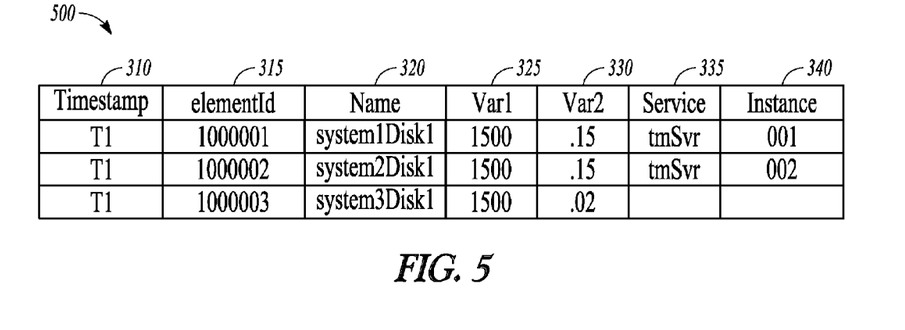
FIG. 5 is a block diagram of a tagged data structure representative of instances of services provisioned to resources according to an example embodiment.
Figure 7:
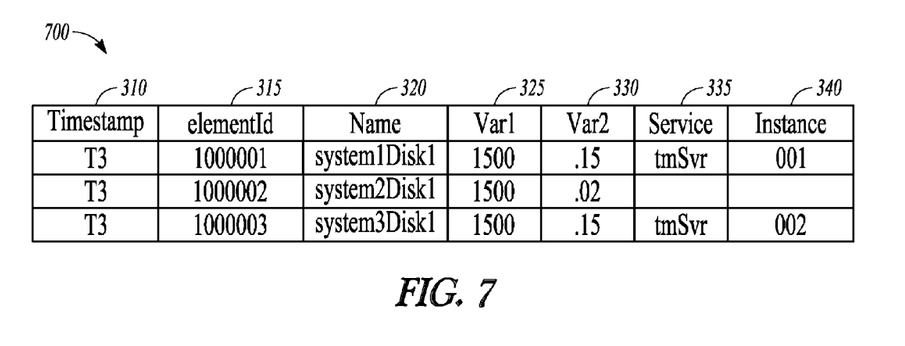
FIG. 7 is a block diagram of a tagged data structure representative of instances of services reprovisioned to resources according to an example embodiment.

In various embodiments, the data structures shown at 300, 500, and 700 may include many thousands of rows, and in some cases, millions of rows stored in a relational database such as database 120. The report engine 145 may use the data to provide reports indicating the resources used to perform services over time, and to track the quality of service that is being provided. It may be used in some embodiments to provide input to dynamic provisioning of applications to scale up or down the capacity of a particular application. Different examples might include scaling up a ticket sale application when a large event becomes available to handle an initial rush for tickets, followed by scaling down the application over time as the demand for service slows down. Since systems may be provisioning many applications to a cloud of resources, it is inevitable that some applications may be increasing in need for capacity, while others are decreasing. Tagging the database dynamically as resource allocation changes provides the ability to quickly track the changes to ensure applications are being apportioned efficiently.

Figure 8:
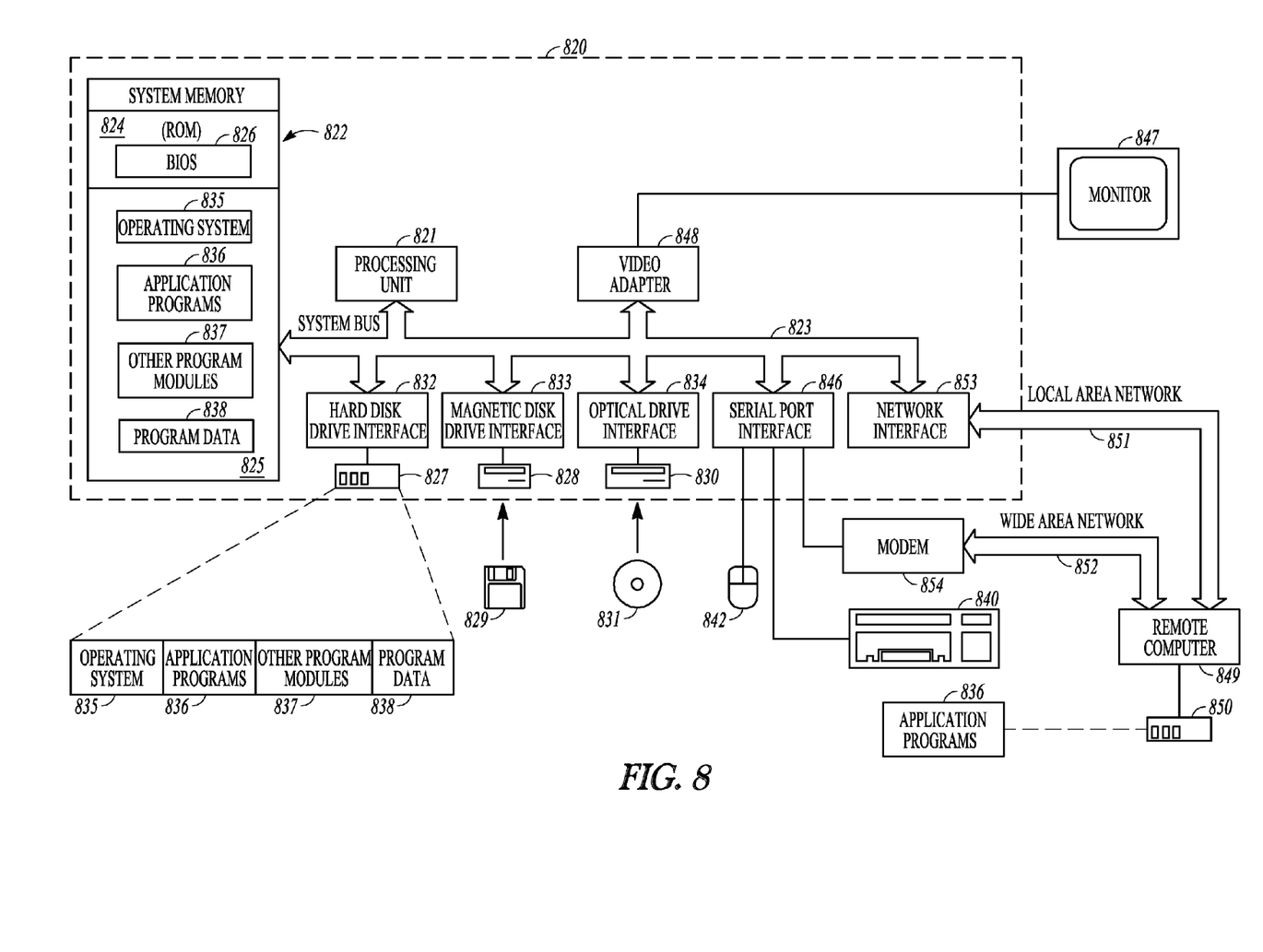
FIG. 8 is a block diagram of a computer system for performing methods and executing code according to an example embodiment.

FIG. 8 is a block diagram of a computer system to implement the methods, systems, infrastructure resources, and databases according to an example embodiment. In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 800 (e.g., a personal computer, workstation, or server), including one or more processing units 821, a system memory 822, and a system bus 823 that operatively couples various system components including the system memory 822 to the processing unit 821. There may be only one or there may be more than one processing unit 821, such that the processor of computer 800 comprises a single central-processing unit (CPU), or a plurality of processing units, commonly referred to as a multiprocessor or parallel-processor environment. In various embodiments, computer 800 is a conventional computer, a distributed computer, or any other type of computer.

The system bus 823 can be any of several types of bus structures including a memory bus or memory controller, a peripheral bus, and a local bus using any of a variety of bus architectures. The system memory can also be referred to as simply the memory, and, in some embodiments, includes read-only memory (ROM) 824 and random-access memory (RAM) 825. A basic input/output system (BIOS) program 826, containing the basic routines that help to transfer information between elements within the computer 800, such as during start-up, may be stored in ROM 824. The computer 800 further includes a hard disk drive 827 for reading from and writing to a hard disk, not shown, a magnetic disk drive 828 for reading from or writing to a removable magnetic disk 829, and an optical disk drive 830 for reading from or writing to a removable optical disk 831 such as a CD ROM or other optical media.

The hard disk drive 827, magnetic disk drive 828, and optical disk drive 830 couple with a hard disk drive interface 832, a magnetic disk drive interface 833, and an optical disk drive interface 834, respectively. The drives and their associated computer-readable media provide non volatile storage of computer-readable instructions, data structures, program modules and other data for the computer 800. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 829, optical disk 831, ROM 824, or RAM 825, including an operating system 835, one or more application programs 836, other program modules 837, and program data 838. Programming for implementing one or more processes or method described herein may be resident on any one or number of these computer-readable media.

A user may enter commands and information into computer 800 through input devices such as a keyboard 840 and pointing device 842. Other input devices (not shown) can include a microphone, joystick, game pad, satellite dish, scanner, or the like. These other input devices are often connected to the processing unit 821 through a serial port interface 846 that is coupled to the system bus 823, but can be connected by other interfaces, such as a parallel port, game port, or a universal serial bus (USB). A monitor 847 or other type of display device can also be connected to the system bus 823 via an interface, such as a video adapter 848. The monitor 847 can display a graphical user interface for the user. In addition to the monitor 847, computers typically include other peripheral output devices (not shown), such as speakers and printers.

The computer 800 may operate in a networked environment using logical connections to one or more remote computers or servers, such as remote computer 849. These logical connections are achieved by a communication device coupled to or a part of the computer 800; the invention is not limited to a particular type of communications device. The remote computer 849 can be another computer, a server, a router, a network PC, a client, a peer device or other common network node, and typically includes many or all of the elements described above I/O relative to the computer 800, although only a memory storage device 850 has been illustrated. The logical connections depicted in FIG. 8 include a local area network (LAN) 851 and/or a wide area network (WAN) 852. Such networking environments are commonplace in office networks, enterprise-wide computer networks, intranets and the internet, which are all types of networks.

When used in a LAN-networking environment, the computer 800 is connected to the LAN 851 through a network interface or adapter 853, which is one type of communications device. In some embodiments, when used in a WAN-networking environment, the computer 800 typically includes a modem 854 (another type of communications device) or any other type of communications device, e.g., a wireless transceiver, for establishing communications over the wide-area network 852, such as the internet. The modem 854, which may be internal or external, is connected to the system bus 823 via the serial port interface 846. In a networked environment, program modules depicted relative to the computer 800 can be stored in the remote memory storage device 850 of remote computer, or server 849. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method comprising:
  monitoring, via a computer, provisioning changes on infrastructure resources that have been provisioned to provide services;
  tagging, via the computer, a state of each infrastructure resource with provisioning changes with a service name and an instance of the service associated with the infrastructure resource, and a time stamp; and
  storing the tagged state of each infrastructure resource with provisioning changes in a storage device.

2. The method of example 1 wherein the state of each infrastructure resource includes a parameter indicative of a capacity of a resource.

3. The method of example 2 wherein a resource comprises a computer system.

4. The method of example 3 wherein the resource comprises a component of a computer system.

5. The method of example 4 wherein the resource is a storage device.

6. The method of example 1 further comprising:
  detecting a fault in a resource having an instance of a service;
  reprovisioning such service to a different resource;
  tagging a state with changes resulting from the reprovisioning; and
  updating the relational database with the tagged changes.

7. The method of example 1 further comprising:
  receiving a posting that an infrastructure resource has been provisioned with a service; and
  discovering changes resulting from the provisioning to perform the tagging.

8. The method of example 7 wherein discovering the changes includes polling the infrastructure resources.

9. A computer program product comprising:
  a computer readable storage medium having computer readable program code embodied therewith, the computer program code comprising:
    computer readable program code configured to:
    monitor provisioning changes on infrastructure resources that have been provisioned to provide services;
    tag a state of each infrastructure resource with provisioning changes with a service name and an instance of the service associated with the resource identifier and a time stamp; and
    store the tagged state in a storage device.

10. The computer program product of example 9 wherein the tagged changes include a parameter indicative of a capacity of a resource.

11. The computer program product of example 10 wherein a resource comprises a computer system.

12. The computer program product of example 11 wherein the resource comprises a component of a computer system.

13. The computer program product of example 12 wherein the resource is a storage device.

14. The computer program product of example 9 wherein the program code is further configured to:
  detect a fault in a resource having an instance of a service;
  reprovision the service to a different resource;
  tag changes resulting from the reprovisioning; and
  update the database with the tagged changes.

15. The program product of example 9 wherein the program code is further configured to:
  post that a provisioning has been performed;
  receive the posting; and
  discover the changes resulting from the provisioning to perform the tagging.

16. The program product of example 15 wherein discovering the changes includes polling the resources.

17. A system comprising:
  a monitoring mechanism coupled to poll infrastructure resources that have been provisioned to provide services, to discover information about each infrastructure resource that has been provisioned and generate a tag of a state of each infrastructure resource that has been provisioned and a service and instance of the service provisioned to the resource, and to store the tag in a storage device; and
  a report engine to create a time series view of the services performed by each resource utilizing said tags.

18. The system of example 17 and further comprising a relational database to store a state for each resource, the state comprising a resource identifier, a time stamp, a service name and an instance of the service.

19. The system of example 18 and further comprising a provisioning mechanism to provision computing infrastructure with services.

20. The system of example 19 wherein the resource comprises a component of a computer system managed by the system via a network.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
  monitoring, via a computer, provisioning changes on infrastructure resources that have been provisioned to provide services;
  tagging, via the computer, a state of each infrastructure resource with provisioning changes with a service name, an instance of the service associated with the infrastructure resource, and a time stamp; and
  storing the tagged state of each infrastructure resource with provisioning changes in a storage device.

2. The method of claim 1 wherein the state of each infrastructure resource includes a parameter indicative of a capacity of a resource and wherein the infrastructure resources comprise servers executing an application.

3. The method of claim 2 wherein the servers comprise computer systems executing one or more instances of the application.

4. The method of claim 3 wherein the resource comprises a component of the computer system.

5. The method of claim 4 wherein the resource is a storage device.

6. The method of claim 1 further comprising:
   detecting a fault in a resource having an instance of a service;
   reprovisioning the service to a different resource;
   tagging a state with changes resulting from the reprovisioning; and
   updating a relational database with the tagged changes.

7. The method of claim 1 further comprising:
   receiving a posting that an infrastructure resource has been provisioned with a service; and
   discovering changes resulting from the provisioning to perform the tagging.

8. The method of claim 7 wherein discovering the changes includes polling the infrastructure resources.

9. A computer program product comprising:
   a non-transitory computer readable storage medium having computer readable program code embodied therewith, the computer program code comprising program code to:
      monitor provisioning changes on infrastructure resources that have been provisioned to provide services;
      tag a state of each infrastructure resource that has provisioning changes with a service name, an instance of the service associated with the infrastructure resource, and a time stamp; and
      store the tagged state in a storage device.

10. The computer program product of claim 9 wherein the state of each infrastructure resource includes a parameter indicative of a capacity of a resource and wherein the infrastructure resources comprise servers executing an application.

11. The computer program product of claim 10 wherein the servers comprise computer systems executing one or more instances of the application.

12. The computer program product of claim 11 wherein the resource comprises a component of the computer system.

13. The computer program product of claim 12 wherein the resource is a storage device.

14. The computer program product of claim 9 further comprising program code to:
   detect a fault in a resource having an instance of a service;
   reprovision the service to a different resource;
   tag changes resulting from the reprovision; and
   update a database with the tagged changes.

15. The computer program product of claim 9 further comprising program code to:
   post that a provisioning has been performed;
   receive the posting; and
   discover the changes resulting from the provisioning to perform the tagging.

16. The computer program product of claim 15 wherein the program code to discover the changes comprises program code to poll the resources.

17. A system comprising:
   a monitoring mechanism coupled to poll infrastructure resources that have been provisioned to provide services, to discover information about each infrastructure resource that has been provisioned and generate a tag of a state of each infrastructure resource that has been provisioned and a service and instance of the service provisioned to the resource, and to store the tag in a storage device; and
   a report engine to create a time series view of the services performed by each resource utilizing said tags.

18. The system of claim 17 further comprising a relational database to store a state for each resource, the state comprising a resource identifier, a time stamp, a service name and an instance of the service.

19. The system of claim 18 further comprising a provisioning mechanism to provision computing infrastructure with services.

20. The system of claim 19 wherein the resource comprises a component of a computer system managed by the system via a network.

* * * * *